UNITED STATES PATENT OFFICE.

EMIL ELSAESSER, OF BARMEN, GERMANY, ASSIGNOR TO DAHL & CO., OF SAME PLACE.

BLUE DYE FOR WOOL.

SPECIFICATION forming part of Letters Patent No. 607,408, dated July 12, 1898.

Application filed July 2, 1896. Serial No. 597,847. (Specimens.)

*To all whom it may concern:*

Be it known that I, EMIL ELSAESSER, a subject of the King of Würtemberg, residing in Barmen, Prussia, German Empire, have invented certain new and useful Improvements in the Production of a Blue Dyestuff for Wool, of which the following is a specification.

This invention relates to the production of a blue dyestuff for wool.

The process is as follows: A mixture of an equal number of molecules of beta-dinaphthylmetaphenylenediamin-disulfonic acid—*i. e.*, amidodimethylanilinthio-sulfonic acid—and of dimethylparaphenylenediaminthiosulfonic acid is oxidized at ordinary temperature. Thus the sulfonic acid of a green indamin is obtained, which by boiling an aqueous solution thereof is transformed into a blue-azin dyestuff. The same result is obtained if dimethylparaphenylenediamin and beta-dinaphthylmetaphenylenediamin-disulfonic acid in equal number of molecules are oxidized together in the presence of thiosulfate of sodium.

Example I: 18.6 kilograms hydrochlorid of nitrosodimethylanilin are transformed under the addition of fifty kilograms of thirty per cent. acetic acid and fifty kilograms of thiosulfate of sodium into amidodimethylanilinthio-sulfonic acid. This solution is mixed with a solution of fifty-six kilograms of the soda-salt of beta-dinaphthylmetaphenylenediamin-disulfonic acid in one thousand liters of water and afterward slowly entered in a solution of thirty kilograms of bichromate of potash in three hundred liters of water, during which it is carefully stirred. Ten kilograms of soda-ash are now added and this solution is then to be boiled. Thereupon the separated oxyhydrate of chromium is filtered off and the dyestuff precipitated with salt. The dyestuff is then dried and sold in the market as an amorphous powder of a dark-bronze shining appearance.

This dyestuff is readily soluble in water and soluble with difficulty in alcohol. It has a blue color. On the addition of hydrochloric acid to the aqueous solution the said dyestuff is rendered somewhat greener, while the addition of soda-lye makes it somewhat redder.

Example II: 13.7 kilograms of amidodimethylanilin, fifty-six kilograms of the soda-salt of beta-dinaphthylmetaphenylenediamin-disulfonic acid, and twenty-five kilograms of thiosulfate of sodium are dissolved together in fifteen hundred liters of water, and into this is entered under well stirring a solution of forty kilograms of bichromate of potash and thirty kilograms of thirty per cent. hydrochloric acid in four hundred liters of water. Ten kilograms of soda-ash are now added and the whole solution boiled and further treated as mentioned in Example I.

What I claim as my invention, and desire to secure by Letters Patent, is—

1. The process of making a blue dyestuff for wool consisting of oxidizing a mixture of beta-dinaphthylmetaphenylenediamin-disulfonic acid and dimethylparaphenylenediaminthio-sulfonic acid in an aqueous solution, and then boiling the oxidized product thus obtained with soda, substantially as set forth.

2. A blue dyestuff for wool derived from beta-dinaphthylmetaphenylenediamin-disulfonic acid and dimethylparaphenylenediaminthio-sulfonic acid forming a dark-bronze shining powder, which is readily soluble and takes on a blue color in water but is with difficulty soluble in alcohol, and with the addition of hydrochloric acid to the aqueous solution is rendered somewhat greener, while the addition of soda-lye makes it somewhat redder.

In testimony whereof I have signed my name to this specification in the presence of two subscribing witnesses.

EMIL ELSAESSER.

Witnesses:
OTTO KÖNIG,
H. F. HESS.